United States Patent [19]

Riekels

[11] Patent Number: 4,480,015

[45] Date of Patent: Oct. 30, 1984

[54] BRAZING METHOD AND ALLOY FOR BISMUTH STEEL

[75] Inventor: Lynda M. Riekels, Munster, Ind.

[73] Assignee: Inland Steel Company, Chicago, Ill.

[21] Appl. No.: 409,158

[22] Filed: Aug. 18, 1982

[51] Int. Cl.$^3$ ............................................. B23K 35/30
[52] U.S. Cl. .................................. 428/677; 420/491; 228/263.11; 228/263.15
[58] Field of Search ...................... 228/263.11, 263.15, 228/263.16; 420/491; 428/677

[56] References Cited

U.S. PATENT DOCUMENTS 2,750,287  6/1956  Burkhardt et al. ................. 420/491
2,879,159  3/1959  Bolkcom et al. .................... 420/491
4,294,395 10/1981  Nayar ............................. 228/263.15

FOREIGN PATENT DOCUMENTS 1198566  8/1965  Fed. Rep. of Germany ...... 420/491

Primary Examiner—Kenneth J. Ramsey
Attorney, Agent, or Firm—Marshall, O'Toole, Gerstein, Murray & Bicknell

[57] ABSTRACT

Embrittlement of a copper brazing joint can occur when a bismuth steel part is brazed to another steel part. Such embrittlement is prevented by providing a small amount of lead (0.05–1.0 wt.%) in the brazing metal at the joint.

21 Claims, No Drawings

BRAZING METHOD AND ALLOY FOR BISMUTH STEEL

BACKGROUND OF THE INVENTION

The present invention relates generally to brazing methods and alloys and more particularly to brazing methods and alloys for use on bismuth steel.

Brazing is a method used to join together two steel parts. The brazing medium is usually in the form of wire composed principally or entirely of copper, or of paste having a metallic part composed principally or entirely of copper, together with an organic binder.

The brazing process is conducted at an elevated temperature above the melting point of the metallic component of the brazing medium (e.g., copper, which has a melting point of 1984° F. (1084° C.)) but below the melting point of the steel parts. During the brazing process, molten brazing metal becomes interposed as a film or layer at the interface between the two steel parts to be adhered together, and the entire assemblage is then allowed to cool to room temperature during which the brazing metal constituting the interfacial film solidifies, causing the two steel parts to adhere together at a brazing joint defined by the solidified brazing metal. In a typical brazing process, the assemblage is heated at a temperature above the melting point of the brazing metal for about fifteen minutes, and then allowed to cool for about one hour.

Oftentimes, one or both of the steel parts which are to be adhered together by brazing is a machined part, and in such instances it is frequently desirable that the machined part be composed of a steel having good machinability qualities. Such steels are known as free-machining steels, and a typical example of a free-machining steel which has been frequently used in the past is a leaded steel. However, there are health hazards associated with the production of a leaded steel, and, more recently, bismuth steels have been utilized in lieu of leaded steels.

However, when a machined part composed of bismuth steel is to be brazed to another steel part, a problem arises which was not present when the machined part was composed of leaded steel. More particularly, it has been found that when a bismuth steel part is brazed to another steel part, the brazing joint is brittle and may fail under service conditions substantially less severe than those at which the individual steel parts fail.

The underlying cause of the embrittlement was determined in the course of the development of the present invention. More particularly, at the elevated temperature at which the brazing process was conducted, the bismuth in the bismuth steel melts and diffuses into the brazing joint where it is dissolved into the copper from the brazing metal. As the copper cools, during the cooling part of the brazing cycle, it solidifies before the bismuth does, and the bismuth is rejected from solution by the copper. Because bismuth has a much lower melting point than copper, the bismuth is still molten as the copper solidifies, and the molten bismuth tends to segregate at the grain boundaries of the copper brazing joint. The segregation of bismuth at these grain boundaries is what creates the embrittlement of the brazing joint.

SUMMARY OF THE INVENTION

In accordance with the present invention, it has been determined that the embrittlement problem can be substantially eliminated by including, in the brazing metal, from 0.05 to 1.0 wt.% lead, preferably 0.2–0.4 wt.% lead. When lead, in the range indicated, is a component of the brazing metal, the bismuth which diffuses from the bismuth steel into the brazing joint is absorbed by the lead and remains in solution with lead while the brazing joint solidifies, and at room temperature, thereby preventing the bismuth from migrating to and segregating at the grain boundaries. Because the bismuth remains in solid solution with lead at room temperature and does not segregate at the grain boundaries of the brazing joint, the embrittling effect on the brazing joint, caused by bismuth in the absence of lead, is prevented.

Other features and advantages are inherent in the method and alloy claimed and disclosed or will become apparent to those skilled in the art from the following detailed description.

DETAILED DESCRIPTION

A brazing composition in accordance with the present invention may be in the form of wire or paste. The brazing wire is typically composed of 0.1–1.0 wt.% lead and the balance copper. The brazing paste has a metallic part typically composed of 0.1–1.0 wt.% lead and the balance copper, together with a conventional organic binder in conventional amounts.

The brazing composition is employed to join together two steel parts, at least one of which is a machined steel part composed of bismuth steel. Typically, the other machined part is composed of plain carbon steel.

Preferably, the brazing metal contains 0.2–0.4 wt.% lead, depending upon the bismuth content of the steel. Typically, the bismuth steel contains 0.05–0.40 wt.% bismuth. The higher the bismuth content of the steel, the higher should be the lead content of the brazing joint in order to prevent embrittlement of the brazing joint.

More particularly, a typically commercial requirement for the strength of a brazing joint is a minimum of 10,000 psi. For a bismuth steel containing 0.15–0.16 wt.% bismuth, a brazing composition having a lead content in the range 0.05–0.1 wt.% gave a joint strength of about 10,000 psi, and a lead content of 0.2 wt.% gave a joint strength of about 12,000 psi. For a bismuth steel having a bismuth content of 0.20 wt.%, a brazing composition having a lead content of about 0.2 wt.% gave an average joint strength of about 10,000 psi, and a lead content of 0.3 wt.% gave a joint strength close to 12,000 psi. For a bismuth steel having a bismuth content in the range 0.25–0.4 wt.% bismuth, a brazing compostion having 0.1 wt.% lead gave a joint strength of about 6,000 psi, a lead content of 0.2 wt.% gave a joint strength of about 7,000 psi, a lead content of about 0.3 wt.% gave a joint strength of about 10,000 psi and a lead content of 0.4 wt.% gave a joint strength of about 12,000 psi. The steel components of the brazed assemblage failed at test stresses greater than 12,000 psi. Accordingly, the joint strength for brazing compositions having a lead content greater than 0.4 wt.% could not be determined except that it was at least 12,000 psi for all lead contents between 0.4 wt.% and 1.0 wt.%.

When the brazing joint was composed of pure copper, with no lead, the joint strength was only about 4,000 psi for a bismuth steel part containing 0.25–0.4 wt.% bismuth. Thus, there was an increase in joint strength of 200% when the lead content was increased from 0 to 0.4 wt.%.

Although the lead content in the brazing joint is preferably provided by including a lead content in the copper brazing composition, the lead in the brazing joint may be provided from a source other than lead as a component of the brazing composition. For example, the lead may be present as a piece or particles which are separate and discrete from the copper wire or copper paste which make up the brazing composition. Alternatively, the other steel part (i.e., the part other than that composed of bismuth steel) may be composed of leaded steel, in which lead is typically present in the range 0.10-0.50 wt.%. During the brazing process, molten lead will migrate from the leaded steel into the brazing joint and provide the desired lead content necessary to absorb into solution the bismuth with migrates from the bismuth steel part.

The two steel parts are brazed together employing conventional brazing procedures. The brazing composition is located, relative to the two steel parts, so as to form a film or layer at the interface between the two steel parts, when the brazing composition melts at the elevated temperature at which the brazing process is conducted. An assemblage consisting of the two steel parts and the unmelted brazing composition, is typically placed within a brazing furnace, and heated therein to a brazing temperature of about 2,050° F. (1121° C.). This is greater than the melting point of copper (1984° F. (1084° C.)), as well as being substantially above the melting point of bismuth (520° F. (271° C.)) and of lead (621° F. (327° C.)). As noted above, one of the steel parts contains 0.05-0.40 wt.% bismuth, and the brazing joint is provided with 0.05-1.0 wt.% lead, either as part of the brazing composition or from some source external to the brazing composition.

During the brazing process, bismuth will migrate from the bismuth steel to the brazing joint, where it is absorbed into solution in the lead at the brazing joint and maintained in solution with the lead while the brazing joint is at the elevated brazing temperature and thereafter when the brazing joint is cooled down to room temperature. Because the bismuth is maintained in solution with the lead, both as a liquid and when the two are solid, the tendency of the bismuth to migrate to the grain boundaries of the brazing joint, a tendency which is quite strong in the absence of lead, is substantially eliminated. The resulting brazing joint has no bismuth embrittlement, and the joint strength is substantially greater than it would be in the absence of lead.

As noted above, the lead content required to give a joint strength comparable to that of the steel parts is about 0.2 wt.% lead when the bismuth steel part has 0.15-0.20 wt.% bismuth and about 0.4 wt.% lead when the bismuth steel part has 0.25-0.4 wt.% bismuth. Thus, for all bismuth compositions between 0.15 and 0.4 wt.%, the preferred lead content for the brazing joint is 0.2-0.4 wt.%.

A brazing composition containing lead in all ranges in accordance with the present invention has, a relatively low lead content, so that such a brazing composition would meet OSHA standards for lead which, in large amounts, can create a health hazard at the temperatures at which the brazing process is conducted.

A brazing composition containing lead in accordance with the present invention is useful for brazing steel parts in which neither part contains bismuth. It need not be restricted to the brazing of steel parts at least one of which contains bismuth. Such a brazing composition is relatively cheap because the replacing constituent, lead, is cheaper than the replaced constituent, copper.

Employing, at the brazing joint, a composition including 0.1-1.0 wt.% lead imparts to the brazing joint the quality of maintaining in solution at both elevated and room temperatures the bismuth with migrates into the copper brazing joint, yet, at the same time, the lead content does not weaken the copper joint. Tin would have an effect similar to lead, but somewhat greater quantities of tin are required. Moreover, tin is relatively expensive compared to lead (and copper), and increases the cost of the brazing composition compared to what is otherwise the same composition but employing lead instead of tin. However, in addition to 0.1-1.0 wt.% lead, the brazing composition may also contain a small amount of tin, as the tin does not adversely affect the characteristics of the brazing joint when used in the brazing of a bismuth steel part.

The bismuth steels and leaded steels, to which reference is made herein, are commercially available, and the compositions thereof are familiar to those skilled in the art. The invention relates to the brazing of bismuth steel, generally, no matter the base composition, and bismuth is generally present in such steel in the range 0.05-0.40 wt.%. Examples of base compositions to which are added either 0.10-0.15 wt.% or 0.20-0.25 wt.% bismuth are set forth below, indicating both a broader range and a preferred range of elements. These compositions consist essentially of, in wt.%:

| Element | Broader Range | Preferred Range |
| --- | --- | --- |
| carbon | 0.06-1.0 | 0.07-0.09 |
| manganese | 0.3-1.6 | 0.96-1.04 |
| sulfur | 0.50 max. | 0.32-0.34 |
| phosphorus | 0.12 max. | 0.06-0.08 |
| silicon | 0.30 max. | 0.02 max. |
| iron | essentially the balance | |

The leaded steels which may be employed as an external source of lead for the brazing joint comprise conventional leaded steels heretofore employed for free machining purposes.

The foregoing detailed description has been given for clearness of understanding only, and no unnecessary limitations should be understood therefrom, as modifications will be obvious to those skilled in the art.

I claim:

1. In a process for joining together, with copper brazing at a brazing joint, two steel parts at least one of which is composed of bismuth-containing steel, and wherein the brazing joint is heated to a brazing temperature above the melting point of copper and subsequently cooled to room temperature, a method for increasing the resistance to embrittlement of the copper brazing joint resulting from the presence of said bismuth, said method comprising the step of:

providing the copper brazing joint with a lead content constituting about 0.05-1.0 wt.% of the brazing metal in the joint.

2. In a process as recited in claim 1 wherein one of said steel parts contains 0.05-0.40 wt.% bismuth and said copper brazing joint is provided with 0.2-0.4 wt.% lead.

3. In a process as recited in claim 1 wherein said copper brazing joint is provided with said lead content by including said lead content in the brazing metal along with said copper.

4. In a process as recited in claim 1 wherein said copper brazing joint is provided with said lead by utilizing a lead-containing steel for the other of said steel parts and diffusing said lead from said other steel part to said copper brazing joint while the joint is heated to said brazing temperature.

5. In a process as recited in claim 4 wherein the steel in said other steel part contains 0.10–0.50 wt.% lead.

6. In a process as recited in claim 1 wherein said lead content in the brazing joint is separate and discrete from the copper content of the brazing joint prior to the brazing operation.

7. In a process as recited in claim 1 wherein said one steel part contains 0.05–0.40 wt.% bismuth, some of said bismuth migrates to said copper brazing joint while the brazing joint undergoes said heating, and said copper brazing joint is provided with sufficient lead to maintain in solution, while the brazing joint cools from said brazing temperature to room temperature, said bismuth which migrated from said one steel part to said brazing joint, whereby said bismuth is prevented from accumulating at the grain boundaries of the copper brazing joint during cooling of the brazing joint to room temperature.

8. In a process as recited in claim 1 wherein said copper brazing joint is provided with a lead content of at least about 0.1 wt.%.

9. A composition for brazing together two steel parts at least one of which contains bismuth, said composition having a metallic content consisting essentially of about 0.05–1.0 wt.% lead and a balance consisting essentially of copper.

10. A brazing composition as recited in claim 9 and in the form of a paste including an organic binder.

11. A brazing composition as recited in claim 9 and in the form of wire.

12. A brazing composition as recited in claim 9 wherein said lead content is at least about 0.2 wt.%.

13. A brazing composition as recited in claim 9 wherein said lead content is in the range 0.2–0.4 wt.%.

14. A brazing composition as recited in claim 9 wherein said lead content is at least about 0.1 wt.%.

15. An article of manufacture comprising:
   two steel parts joined together with copper brazing at a brazing joint;
   at least one of said steel parts being composed of bismuth-containing steel;
   said brazing joint having a lead content constituting about 0.05–1.0 wt.% of the brazing metal in the joint, the balance of said brazing metal consisting essentially of copper.

16. An article of manufacture as recited in claim 15 wherein:
   said one steel part contains 0.05–0.40 wt.% bismuth and said brazing joint contains 0.2–0.4 wt.% lead.

17. An article of manufacture as recited in claim 15 wherein:
   the other of said steel parts contains 0.10–0.50 wt.% lead.

18. An article of manufacture as recited in claim 15 wherein:
   said brazing joint contains bismuth.

19. An article of manufacture as recited in claim 18 wherein:
   said brazing joint has grain boundaries;
   substantially all of the bismuth contained in said brazing joint is in solid solution with said lead in the brazing joint;
   and substantially none of the bismuth in the brazing joint is segregated at the grain boundaries of the brazing joint.

20. An article of manufacture as recited in claim 18 wherein:
   said brazing joint has a joint strength of at least 10,000 psi.

21. An article of manufacture as recited in claim 15 wherein:
   said brazing joint has a lead content of at least about 0.1 wt.%.

* * * * *